Oct. 29, 1963
M. C. HILL
3,108,645
DRILL FOR TRACTORS
Filed April 12, 1961
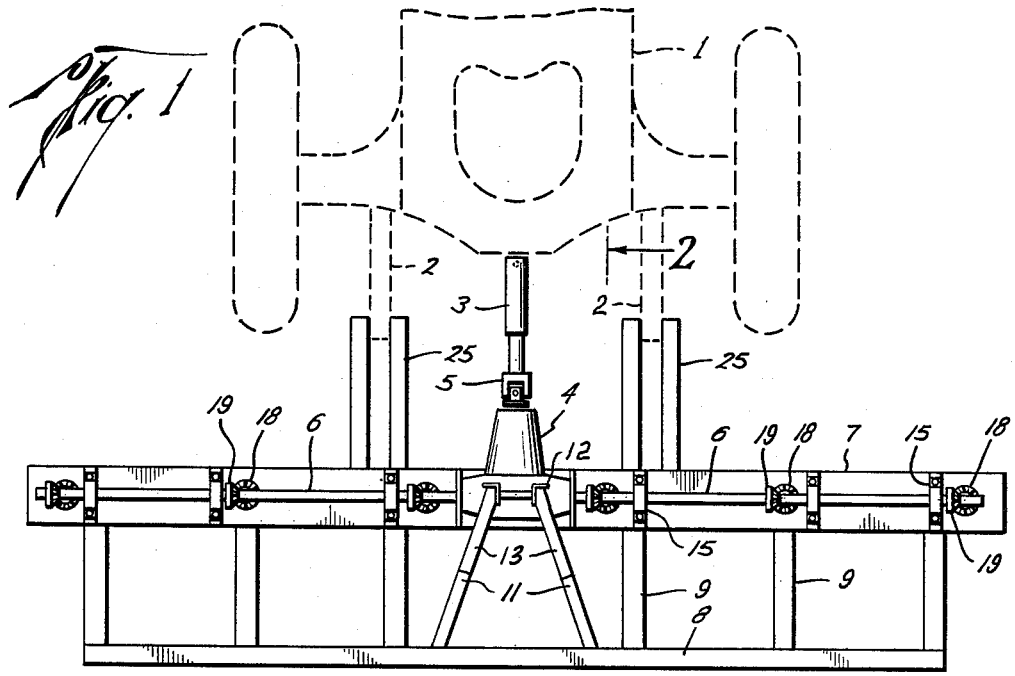
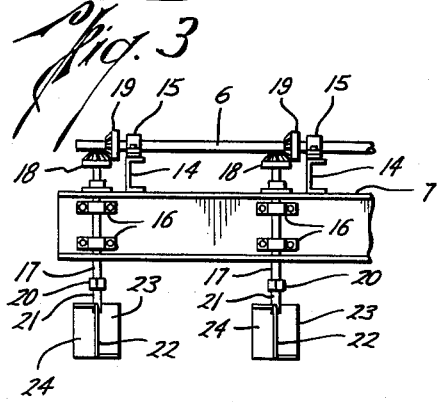
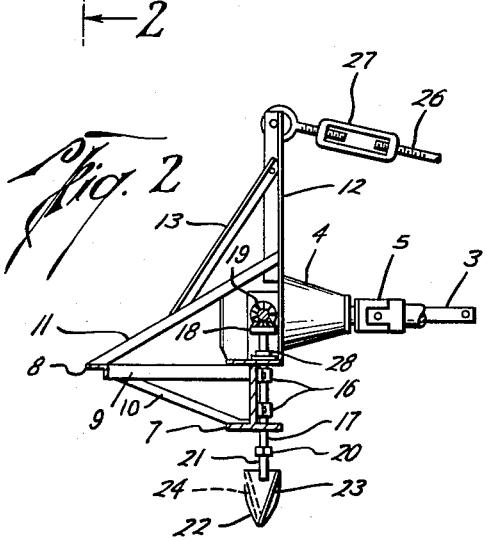
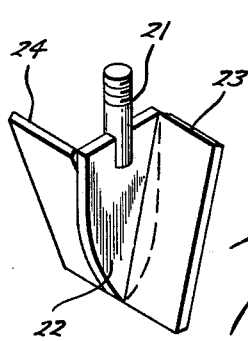
Martin C. Hill
INVENTOR.
BY Pamela O Wyatt
ATTORNEY United States Patent Office 3,108,645
Patented Oct. 29, 1963

3,108,645
DRILL FOR TRACTORS
Martin C. Hill, 6906 Fulton, Houston, Tex.
Filed Apr. 12, 1961, Ser. No. 102,421
3 Claims. (Cl. 175—108)

This invention relates to new and useful improvements in a drill for tractors.

It is an object of this invention to provide a drill for forming sod planting openings to be attached to a tractor.

It is another object of the invention to provide a drill having novel means for forming a plurality of sod planting openings by means of bits rotated by the power take off of a tractor and raised and lowered by means of the elevator of a tractor.

It is another object of the invention to provide a drill for forming sod planting openings having novel means for boring into the earth and forming an opening having loose soil at the bottom and the excavated soil deposited adjacent the top of the opening.

With the above and other objects in view, the invention has relation to certain novel features of construction, operation and arrangement of parts more particularly defined in the following specification and illustrated in the accompanying drawings, wherein:

FIGURE 1 is a top plan view of the device attached to a tractor.

FIGURE 2 is a cross sectional end view taken on the line 2—2 of FIGURE 1.

FIGURE 3 is a fragmentary front elevational view and

FIGURE 4 is a front elevational view of the bit employed.

Referring now more particularly to the drawings, the numeral 1 designates a tractor having an elevator 2, 2 and a power take off 3. A gear box 4 is mounted on the framework I-beam 7 and is actuated by the power take off 3 through the coupling 5 and the drive shafts 6, 6 are rotated through the gears (not shown) in the gear box 4. The framework is formed by means of the I-beam 7 and stabilizer bar 8, which may be formed of an angle iron beam and which is mounted on the I-beam 7 by means of the horizontal bars 9, 9 which are welded, or otherwise secured to the underside of the top plate of the I-beam 8 at one end and to the stabilizer bar 8 at the other end. Suitable lower brace members 10 extend from the stabilizer bar 8 to the inside lower plate of the I-beam 7. Upper brace members 11, 11 are welded at one end to, and extend from, the stabilizer bar 8 to the upper margin of the gear box housing 4 where they are welded, or otherwise secured, to the gear box 4 and to the vertical stabilizer arm 12. A pair of additional supporting members, as the angle irons 13, are welded, or otherwise secured to the stabilizer arm 12 and to the upper brace members 11.

The shafts 6, 6 are mounted on the upper face of the member 7 on the channel iron bearing blocks 14, 14 which support the bearings 15, 15 through which the shafts 6, 6 extend. On the vertical plate of the I-beam 7, at longitudinally spaced intervals, are the bearings 16, 16 through which the bit shafts 17, 17 extend.

Gears 18, 18 are mounted on the upper ends of the shafts 17 and are in mesh with gears 19, 19 which are slidable longitudinally on the drive shafts 6, 6. A suitable locking means, as the collar 28, maintains the gears 18 in mesh with the gears 19.

Mounted on the lower ends of the shafts 17, 17 are suitable couplings 20, 20 in which the upper end of the bit shafts 21, 21 are detachably mounted. The lower end of the bit shafts 21 are mounted on the center blade 22 of the bit, as by welding, the lower end of the shafts 21 being grooved to straddle the center blade 22 and the upper end of the shafts 21 are externally threaded. The bit is formed of three blades, the center blade 22 being flat and having its longitudinal side margins tapered from a point approximately midway of the longitudinal ends, terminating in a sharp point, and the two side blades being rectangular and welded, or otherwise secured, to the respective side faces of the center blade, one side margin of the side blade 23 being welded or otherwise secured to one flat face of the center blade and extending from one corner of the wide end of the center blade to the point of the center blade and the other blade 24 having one side margin welded or otherwise secured to the opposite face of the center blade and extending from the opposite corner of the wide end of the center blade to the point of the center blade. The lower end face of the blades 23, 24 being beveled to provide a sharp cutting edge.

The elevator connecting arms 25, 25 extend from the I-beam 7 and are connected to the elevators 2, 2 of the tractor. A cable 26 with the conventional turnbuckle 27, extends from the upper end of the stabilizer arm 12 to a suitable anchor on the tractor (not shown). The shafts 17 are maintained in position in the bearings 16, 16 so that the gears 18, 18 will be in mesh with the gears 19, 19 by means of the collar 28.

A framework having six bits is shown in the drawings, however, it is contemplated that the number of bits employed is selective, and the spacing and number of bits may be varied as desired by providing a plurality of holes through the I-beam.

In operation, the elevator connecting arms 25, 25 are connected to the elevators 2, 2 of the tractor and the coupling 5 connected to the power take off 3. As the power take off rotates the shafts 6, 6, the bit shafts 17, 17 will rotate, rotating the bits. The elevators are lowered and the bits contact the earth and drill openings, the soil broken up by the bits moving upwardly and outwardly on the blades 23, 24, the stabilizer bar 8, the stabilizing arm 12 and the cable 26, maintaining the framework steady, with the vertical bit shafts in vertical position with relation to the earth, as drilling progresses. The blades 23, 22 and 24 break up the soil during drilling operations, and upon lifting the framework to move to the next location, the broken earth not yet moved out of the opening will fall back into the opening to form a bed of loose soil for the sod to be planted.

In using this device for planting sod, where sod is planted in small pieces, the tractor may move ahead of three workers, forming openings with loose soil in them, so that the planters need but drop a piece of sod in the openings on the bed of loose soil and then kick in enough of the loose soil outside of the opening to adequately effect a planting.

While the foregoing is considered a preferred form of the invention, it is by way of illustration only, the broad principle of the invention being defined by the appended claims.

What I claim is:

1. In a drill for use on tractors having elevators and power take off means, a framework, said framework having a plurality of vertical drive shafts, means for rotating said drive shafts, bits detachably mounted on the lower ends of said vertical drive shafts, said bits having a center blade, the side margins of which taper to a point at the lower end thereof and having side blades integral with and extending laterally from said center blade, the side margin of each side blade extending from an opposite upper end corner of said center blade to said point.

2. In a drill for use on tractors having elevators and power take off means, a framework, said framework having a plurality of vertical drive shafts, means for rotating said drive shafts, bits detachably mounted on the lower ends of said vertical drive shafts, said bits having a center blade, the side margins of which taper to a point at the lower end thereof and having side blades integral with and extending laterally from said center blade, the side margin of each side blade extending from an opposite upper end corner of said center blade to said point, and the lower end face of each of said side blades being beveled to provide a sharp cutting edge.

3. In a drill, rotatable drive shafts, means for supporting said drive shafts, bits mounted on the lower end of said drive shafts, said bits having a center blade, the side margins of said center blade tapering to a point, side blades integral with and extending laterally from said center blade, the side margin of each side blade extending from an opposite upper end corner of said center blade to said point and the lower end face of said side blades being beveled to provide a sharp cutting edge.

References Cited in the file of this patent

UNITED STATES PATENTS

| | | |
|---|---|---|
| 531,967 | Rachielles | Jan. 1, 1895 |
| 2,067,781 | Mueller | Jan. 12, 1937 |
| 2,303,726 | Dettloff et al. | Dec. 1, 1942 |
| 2,394,771 | Hill | Feb. 12, 1946 |
| 2,410,508 | Lamme | Nov. 5, 1946 |
| 2,490,698 | McClenny | Dec. 6, 1949 |
| 2,521,417 | Sefcovic | Sept. 5, 1950 |
| 2,581,535 | Jackson | Jan. 8, 1952 |
| 2,741,173 | White | Apr. 10, 1956 |
| 2,983,322 | Heeren | May 9, 1961 |
| 3,026,948 | Pettee | Mar. 27, 1962 |